United States Patent [19]

Axtell

[11] Patent Number: 5,065,643
[45] Date of Patent: Nov. 19, 1991

[54] COMPOUND PULL CABLE OPERATING LEVER

[75] Inventor: Lloyd L. Axtell, Portland, Oreg.

[73] Assignee: Hyster Company, Portland, Oreg.

[21] Appl. No.: 668,960

[22] Filed: Mar. 13, 1991

[51] Int. Cl.⁵ .............................................. F16C 1/12
[52] U.S. Cl. ...................................... 74/501.6; 74/523
[58] Field of Search ................. 74/501.5 R, 501.6, 523

[56] References Cited

U.S. PATENT DOCUMENTS

| | | | |
|---|---|---|---|
| 2,464,096 | 3/1949 | Orscheln | 74/518 |
| 3,057,221 | 10/1962 | Smith | 74/501.6 X |
| 3,101,821 | 8/1963 | Henry | 74/501.6 X |
| 4,127,042 | 11/1978 | Lipshield | 74/520 |
| 4,292,858 | 10/1981 | Lipshield | 74/501 R |
| 4,353,265 | 10/1982 | Lipshield | 74/501.6 X |
| 4,850,238 | 7/1989 | Inoue | 74/501.6 X |
| 4,958,536 | 9/1990 | Baumgarten | 74/501.6 X |
| 5,000,059 | 3/1991 | Barnard | 74/501.6 X |

*Primary Examiner*—Dwight Diehl
*Attorney, Agent, or Firm*—Tim A. Long

[57] ABSTRACT

An "overcenter" toggle type, pull cable operating lever having a compound operating lever. The hand lever of the compound operating lever is linked to an intermediate lever which, in turn, is linked to a cable slide arranged to axially displace a pull cable. The mechanical advantage of the pull cable operating lever is a function of the product of the mechanical advantages of the hand lever and intermediate lever. Compact pull cable operating levers with high mechanical advantages are possible.

4 Claims, 3 Drawing Sheets

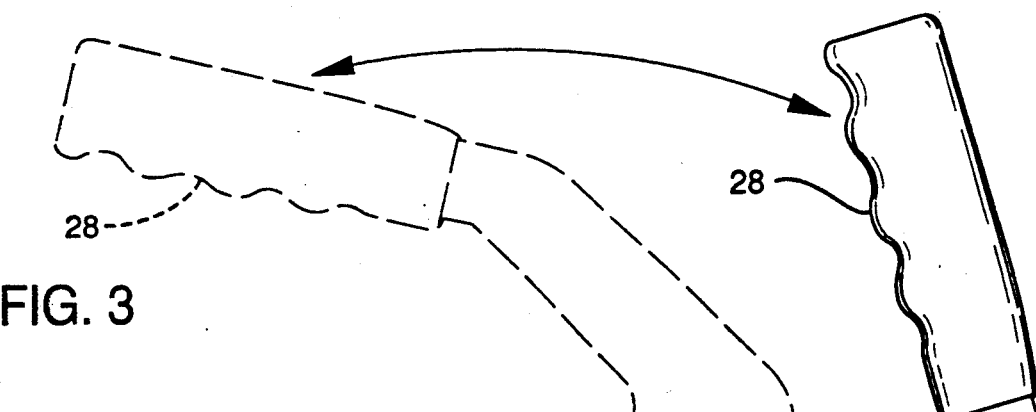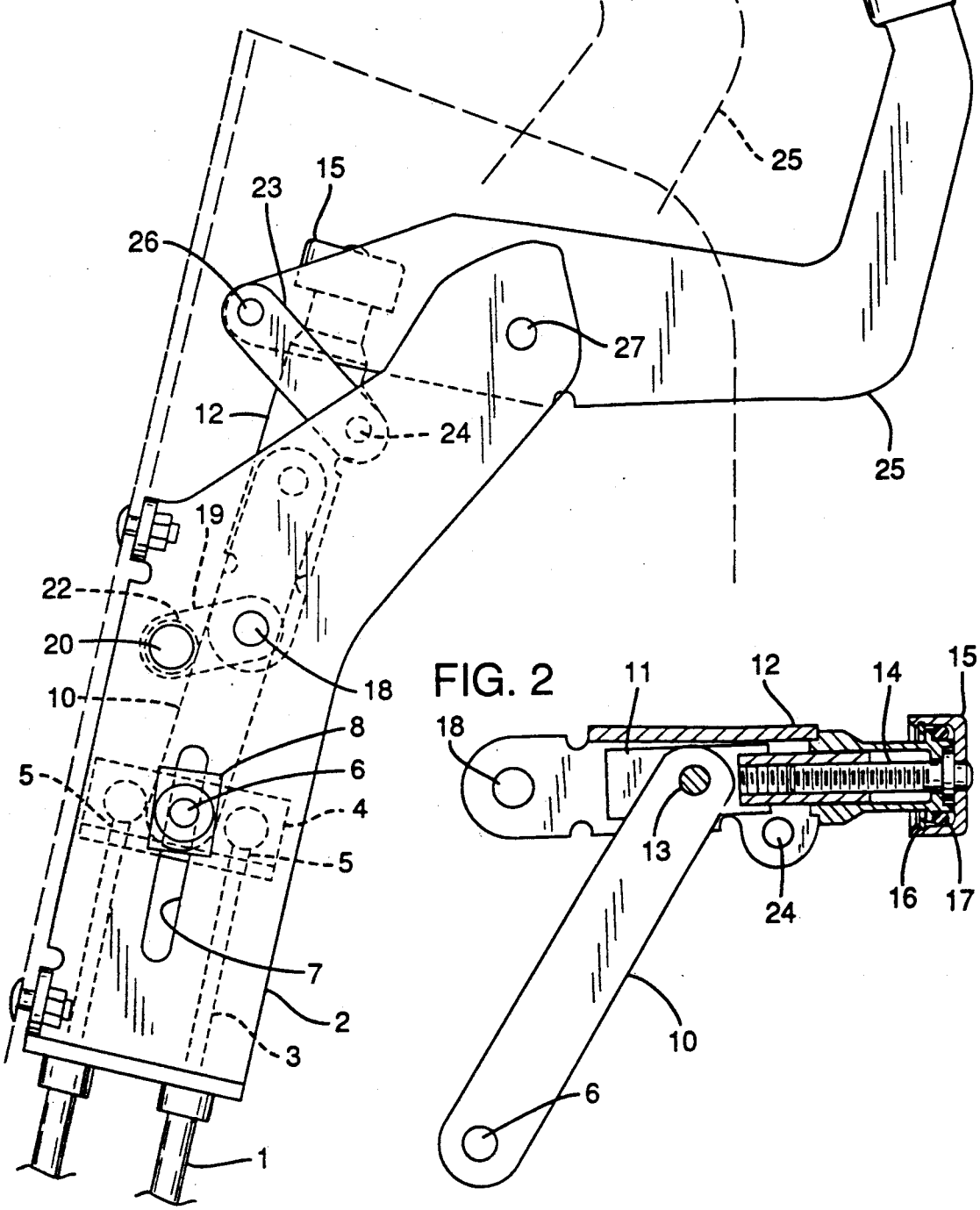

COMPOUND PULL CABLE OPERATING LEVER

BACKGROUND OF THE INVENTION

1. Field of the Invention

The field of art to which this invention pertains is pull cable operating levers and, more specifically, overcenter toggle-type, pull cable operating levers.

2. Description of the Related Art

The overcenter toggle-type, pull cable operating lever, as described in U.S. Pat. No. 2,464,096, is commonly used to operate vehicle parking brakes and other mechanisms actuated by a pull cable. The outer sheath of a coaxial pull cable is attached to the frame of the operating lever at one end and the frame of the vehicle at the other. The movable inner cable is attached to a brake shoe actuation mechanism in the vehicle's brake assembly and, at the other end, to a movable cable slide, guided in the frame of the operating lever assembly. A link connects the movable cable slide to a hand lever which is pivotally attached to the frame of the operating lever assembly. When the vehicle operator moves the hand lever from the "released" to the "applied" position, the movable cable slide is displaced drawing the inner cable through the outer sheath applying the brake. As the hand lever is rotated toward the "applied" position, the line connecting the points of attachment of the link rotates toward and then to the opposite side of the hand lever pivot. The mechanism goes "overcenter" causing the force exerted by the brake cable to urge or toggle the hand lever to the "applied" position. The hand lever will remain in the "applied" position until sufficient force is applied to the hand lever to move the mechanism "overcenter" in the direction of the "brake released" position.

The prior art overcenter toggle type, pull cable operating lever provides a simple and reliable means of mechanically applying a brake or other pull cable actuated device. The operator can, with reasonable force, produce adequate cable displacement and force for most applications. Maximum cable displacement is a function the distance from the hand lever pivot to the link attachment point and is maximized when the lever rotates 90 degrees. The mechanical advantage of the lever, a function of the ratio of the distances from the hand lever pivot to the point of attachment of the link and point of application of force by the operator's hand, varies throughout the range of hand lever motion, but reaches its maximum as the mechanism goes "overcenter." If required by the application, cable displacement can be increased by lengthening the distance from the hand lever pivot to the link attachment point. However, increasing displacement or reducing operator hand force requires lengthening the hand lever to maintain or increase the mechanical advantage of the hand lever. A longer hand lever requires additional motion and exertion by the vehicle operator and may make it difficult to position the operating lever assembly in the operator's station.

SUMMARY OF THE INVENTION

The invention is an overcenter toggle type, pull cable operating lever having a compound operating lever. The hand lever of the compound operating lever is linked to an intermediate lever which is in turn linked to the movable cable slide in a manner similar to the prior art operating lever. The intermediate lever to cable slide linkage goes "overcenter" when the hand lever is "applied" causing the compound lever to toggle to the "applied" position. The mechanical advantage of the compound operating lever is a function of product of the mechanical advantage of hand lever, the mechanical advantage of the intermediate lever and the efficiency of the connecting linkage. As in the prior art lever, the mechanical advantage of the compound lever varies throughout the range of motion of the hand lever. Likewise, the dimensions of the compound operating lever can be selected to optimize the balance of displacement and force for a particular application. However, in one combination both the hand force required to generate a specific braking force and the angular rotation of the hand lever were reduced by 30% compared to a prior art lever having the same radius of hand motion and producing the same cable displacement. The compound pull cable operating lever provides an overcenter toggle type lever with improved performance in a compact assembly.

BRIEF DESCRIPTION OF THE DRAWINGS

The invention is described below with reference to the accompanying drawings where:

FIG. 2 is a section view of the intermediate lever of the compound pull cable operating lever;

FIG. 3 is a side view of the compound pull cable operating lever in the "applied" position;

DESCRIPTION OF THE PREFERRED EMBODIMENT

Figure 1:
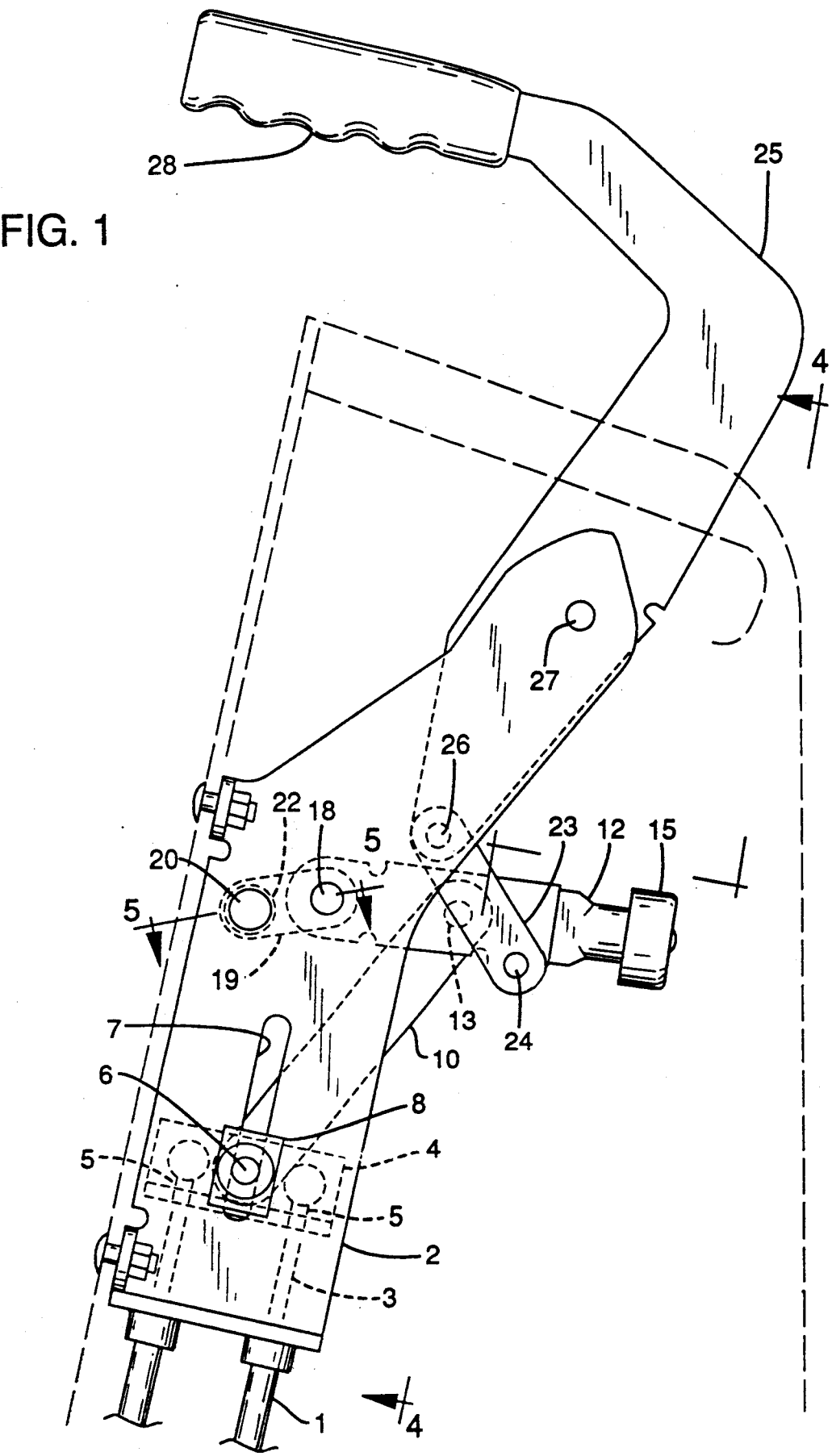
FIG. 1 is a side view of the compound pull cable operating lever in the "released" position.

In many vehicles, the parking brake is mechanically actuated by manual operation of a parking brake cable operating lever. The brake cable is a coaxial pull cable comprising an outer sheath 1 which is anchored, at one end, to the vehicle's frame near the brake assembly (not shown) and to the frame 2 of a pull cable operating lever at the other end; and an inner cable 3 which is arranged for axial displaced within the sheath. The inner cable is attached to a crank at the brake assembly and when the cable is pulled, drawn into the sheath at the brake end, the crank, through mechanical linkage, forces the brake shoes against the brake drum. The second end of the cable, as illustrated in FIG. 1, is attached to a compensator 4, a component of the movable cable slide of the operating lever. The cable terminates in a spherical fitting which engages one of two slots 5 in the compensator. A second slot is engaged by a cable actuating a similar brake in the second braked wheel. The compensator is pivotally supported by the compensator pin 6 which is centrally located between the cable engagement slots. As a result, force in the two brake cables are equalized.

The frame of the cable operating lever assembly, comprising two parallel, spaced apart plates 2, is attached to the vehicle's frame at the operator's station. The plates have corresponding longitudinal slots 7 which are engaged by slide blocks 8 of T-shaped cross-section. The flange of a slide block bears on the outer surface of the frame plate and the stem engages the edges of the longitudinal slot controlling movement and reducing friction and wear as the compensator moves under the influence of high cable forces. The compensator pin, retained by a split pin 9, engages the compensator, slide blocks and an adjuster link 10 to form a cable slide.

Figure 4:
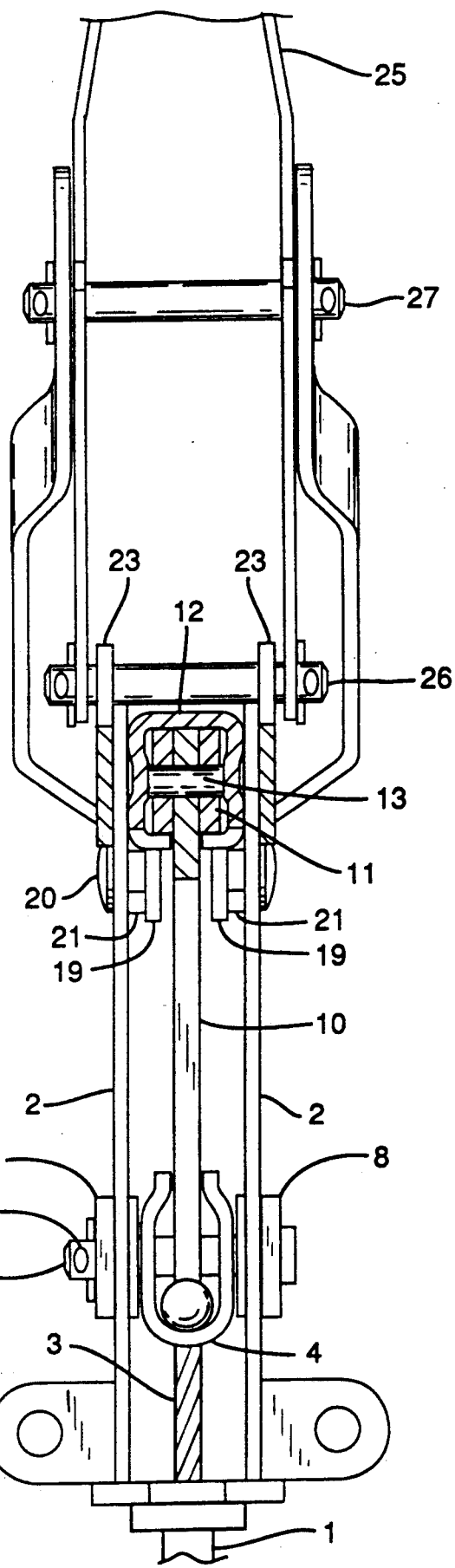
FIG. 4 is a sectional view of the compound pull cable operating lever generally along line 4—4 of FIG. 1.

The adjuster link, as illustrated in FIG. 2, is pivotally attached at its second end to a movable clevis 11 in an intermediate lever 12. A clevis pin 13 engages the adjuster link and the yoke of the clevis which is arranged for axial movement, but restrained against rotation within the body of the intermediate lever, see FIG. 4. An internally threaded rod end portion of the clevis is engaged by the external threads of an adjustment screw 14 having an attached knob 15 for engagement by the operator's hand. A snap ring 16 retains the adjuster screw in the body of the intermediate lever 12 and an elastomer O-ring 17, captive between the adjuster screw and the body of the intermediate lever, induces sufficient friction to prevent the adjuster screw from turning except when rotated by the operator. When the adjuster screw is rotated, the clevis is moved axially within the body of the intermediate lever. Movement of the clevis, transmitted to the compensator by the adjuster link, causes cable to be drawn in or out to compensate for brake shoe wear or cable stretch so that displacement of the cable by operation of the hand lever will be adequate to fully engage the brake shoes.

Figure 5:
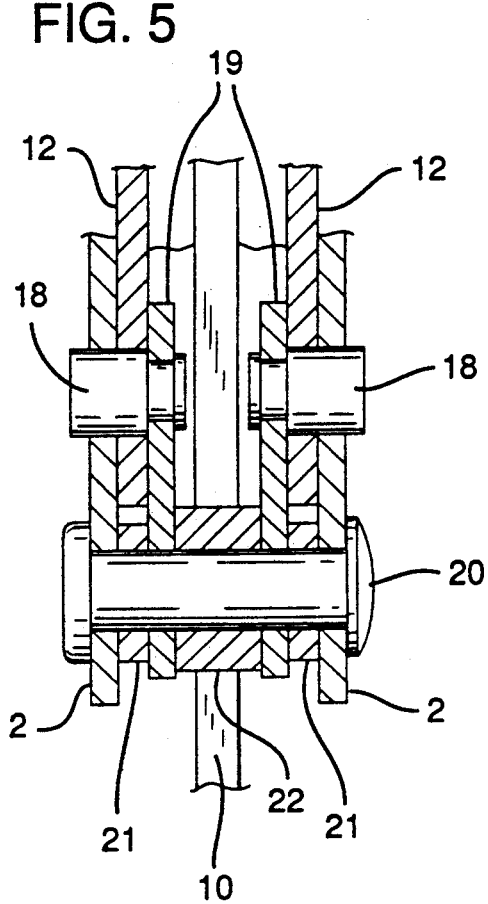
FIG. 5 is a sectional view of the compound pull cable operating lever generally along line 5—5 of FIG. 1.

The intermediate lever is pivotally attached to the frame plates by pivot pins 18 which are riveted to pivot plates 19 and engage corresponding holes in the body of the intermediate lever and the frame plates, as shown in FIG. 5. The pivot plates are secured to the frame plates by a rivet 20. Spacers 21 and 22 maintain clearance to permit the intermediate lever to rotate and to allow the adjuster link to pass between the pivot plates. As the intermediate lever is rotated, see FIG. 3, the adjuster link moves the compensator to draw the cables toward the brake lever assembly to apply the brakes. The adjuster link rotates toward the pivot pins of the intermediate lever and when the line connecting the centers of two pins engaging the adjuster link is displaced to the opposite side the centerline of the pivot pins the linkage will go "overcenter." When the linkage goes "overcenter" the force exerted by the cable, acting through the adjuster link, urges or toggles the linkage to the "applied" position and will act to resist movement of the hand lever which would release the brake. Contact between the adjuster link and spacer 22 limits movement of the intermediate lever and cable slide.

In the compound operating lever the intermediate lever pivots when force is exerted through intermediate links 23 pivotally attached at one end by pin 24 to the intermediate lever and, at the second end, to the hand lever 25 by pin 26. The hand lever is pivotally mounted to the frame by pin 27 which engages corresponding holes in the hand lever and frame plates and has a hand grip portion 28 at one end for engagement by the operator.

To apply the parking brake, cable is pulled through the outer sheath by the movement of the compensator causing the mechanism in the brake assembly to force the brake shoes against the brake drum. The available cable displacement is a function of the distance from the pivot of the intermediate lever to the attachment point of the adjuster link and the angular rotation of the intermediate lever in moving from the "released" to the "applied" position. The force required in the intermediate link is a function of linkage efficiency, determined principally by the angular position of the intermediate and adjuster links, and the mechanical advantage of the intermediate lever; the ratio of the distances from the intermediate lever pivot to the attachment points for the intermediate and adjuster links. The hand force required of the operator is, in turn, a function of the angular position of the hand and the intermediate link and the mechanical advantage of the hand lever; the ratio of the distances from the hand lever pivot to the point of application of force by the operator's hand and the point of connection of the intermediate link. The mechanical advantage of the compound pull cable operating lever assembly is, therefore, a function of the product of the mechanical advantage of the hand lever, the mechanical advantage of the intermediate lever and the efficiency of the linkage.

The dimensions of the compound operating lever can be altered to optimize displacement, hand force, hand lever movement and cable force for a particular application. While comparisons are difficult because the number of different potential cable operating levers and the variation of the mechanical advantage throughout the range of hand lever movement; in one compound lever both the hand force required to generate a specific braking force and the angular rotation of the hand lever were reduced by 30% compared to a prior art cable operating lever having the same radius of hand motion and producing the same cable displacement.

Having described the preferred embodiment of the invention it will be apparent to those skilled in the art that various other forms thereof can be provided without departing from the true spirit and scope of the invention. I claim in my invention all such variations as fall within the scope of the following claims.

What is claimed is:

1. An overcenter toggle type pull cable operating lever comprising:
   a) a frame;
   b) a cable slide for connection to a pull cable and arranged for displacement within the frame along the axis of the pull cable;
   c) an adjuster link pivotally connected to the cable slide and pivotally connected to;
   d) an intermediate lever arranged within the frame to rotate about a pivot when acted upon by;
   e) an intermediate link pivotally connected to the intermediate lever and pivotally connected to;
   f) a hand lever arranged within the frame for rotation about a pivot.

2. The pull cable operating lever of claim 1 wherein the cable slide comprises:
   a) a compensator pin pivotally connecting the adjuster link to;
   b) a compensator arranged for connection to a plurality of pull cables and engaging;
   c) a slide block having perpendicular surfaces bearing on the frame at portions defining a slot therein.

3. The pull cable operating lever of claim 1 wherein rotation of the intermediate lever from a first "released" position to a second "applied" position causes a line connecting the centers of the pivotal connections of the adjuster link to be displaced to the opposite side of the intermediate lever pivot.

4. The pull cable operating lever of claim 3 wherein the cable slide comprises:
   a) a compensator pin pivotally connecting the adjuster link to;
   b) a compensator arranged for connection to a plurality of pull cables and engaging;
   c) a slide block having perpendicular surfaces bearing on the frame at portions defining a slot therein.

* * * * *